(12) United States Patent
Jeske

(10) Patent No.: US 12,033,541 B2
(45) Date of Patent: Jul. 9, 2024

(54) LABELS AND ROLLS WITH ADHESIVES TO STICK TO MOIST AND DRY SURFACES

(71) Applicant: Iconex LLC, Duluth, GA (US)

(72) Inventor: Debora R. Jeske, Morristown, TN (US)

(73) Assignee: Iconex LLC, Duluth, GA (US)

( * ) Notice: Subject to any disclaimer, the term of this patent is extended or adjusted under 35 U.S.C. 154(b) by 0 days.

(21) Appl. No.: 17/374,720

(22) Filed: Jul. 13, 2021

(65) Prior Publication Data
US 2021/0343192 A1    Nov. 4, 2021

Related U.S. Application Data

(63) Continuation of application No. 16/022,147, filed on Jun. 28, 2018, now Pat. No. 11,151,907.

(51) Int. Cl.
| | |
|---|---|
| *G09F 3/10* | (2006.01) |
| *B41M 3/00* | (2006.01) |
| *C09J 5/00* | (2006.01) |
| *C09J 7/38* | (2018.01) |
| *G09F 3/02* | (2006.01) |

(52) U.S. Cl.
CPC ............... *G09F 3/10* (2013.01); *B41M 3/006* (2013.01); *C09J 5/00* (2013.01); *C09J 7/385* (2018.01); *C09J 2203/334* (2013.01); *C09J 2433/00* (2013.01); *G09F 2003/0229* (2013.01); *G09F 2003/023* (2013.01); *G09F 2003/0241* (2013.01)

(58) Field of Classification Search
CPC ............... G09F 3/10; G09F 2003/0229; G09F 2003/023; G09F 2003/0241; C09J 5/00; C09J 2203/334; C09J 2433/00; C09J 7/385; B41M 3/006
See application file for complete search history.

(56) References Cited

U.S. PATENT DOCUMENTS

| | | | |
|---|---|---|---|
| 4,738,391 A * | 4/1988 | Wiseman | B65D 27/14 229/80 |
| 5,234,734 A | 8/1993 | Hamada | |
| 5,827,609 A | 10/1998 | Ercillo et al. | |
| 6,730,396 B2 * | 5/2004 | Maloney | C09J 7/20 428/40.1 |
| 9,777,196 B2 | 10/2017 | Thibault et al. | |

(Continued)

FOREIGN PATENT DOCUMENTS

| | | |
|---|---|---|
| WO | WO-9929436 A1 | 6/1999 |
| WO | WO-9966000 A1 | 12/1999 |

(Continued)

OTHER PUBLICATIONS

"U.S. Appl. No. 16/022,147, Advisory Action mailed Jan. 28, 2021", 3 pgs.

(Continued)

*Primary Examiner* — Laura C Powers
(74) *Attorney, Agent, or Firm* — Schwegman Lundberg & Woessner, P.A.

(57) ABSTRACT

A label is constructed with multiple separate adhesives or a mixture of a non-moisture activated adhesive and a moisture-activated adhesive and applied in multiple patterns on a backside of the label. The label maintains adhesive bonding characteristic when the backside of the label is affixed to dry, cool, warm, and wet surfaces.

12 Claims, 5 Drawing Sheets

(56) References Cited

U.S. PATENT DOCUMENTS

| | | | |
|---|---|---|---|
| 2007/0267146 A1* | 11/2007 | Vigunas | B05D 7/50 156/443 |
| 2009/0162595 A1 | 6/2009 | Ko et al. | |
| 2013/0202885 A1 | 8/2013 | Dodge et al. | |
| 2013/0260991 A1 | 10/2013 | Van Boom et al. | |
| 2014/0199477 A1 | 7/2014 | Roth et al. | |
| 2020/0005681 A1 | 1/2020 | Jeske | |

FOREIGN PATENT DOCUMENTS

| | | |
|---|---|---|
| WO | WO-2015118213 A1 | 8/2015 |
| WO | WO-2015153987 A1 | 10/2015 |
| WO | WO-2020005720 A1 | 1/2020 |

OTHER PUBLICATIONS

"U.S. Appl. No. 16/022,147, Final Office Action mailed Dec. 7, 2020", 19 pgs.

"U.S. Appl. No. 16/022,147, Non Final Office Action mailed Jun. 29, 2020", 10 pgs.

"U.S. Appl. No. 16/022,147, Notice of Allowance mailed Jun. 16, 2021", 15 pgs.

"U.S. Appl. No. 16/022,147, Response filed Mar. 5, 2021 to Advisory Action mailed Jan. 28, 2021".

"U.S. Appl. No. 16/022,147, Response filed Jun. 17, 2020 to Restriction Requirement mailed Apr. 17, 2020", 6 pgs.

"U.S. Appl. No. 16/022,147, Response filed Sep. 29, 2020 to Non Final Office Action mailed Jun. 29, 2020", 8 pgs.

"U.S. Appl. No. 16/022,147, Response filed Dec. 29, 2020 to Final Office Action mailed Dec. 7, 2020", 8 pgs.

"U.S. Appl. No. 16/022,147, Restriction Requirement mailed Apr. 17, 2020", 7 pgs.

"European Application Serial No. 19824829.6, Extended European Search Report mailed Jul. 1, 2021", 10 pgs.

"International Application Serial No. PCT/US2019/038304, International Search Report mailed Sep. 5, 2019", 2 pgs.

"International Application Serial No. PCT/US2019/038304, Written Opinion mailed Sep. 5, 2019", 6 pgs.

\* cited by examiner

LABELS AND ROLLS WITH ADHESIVES TO STICK TO MOIST AND DRY SURFACES

RELATED APPLICATIONS

The present application is a continuation of and claims priority to co-pending U.S. patent application Ser. No. 16/022,147 filed on Jun. 28, 2018 entitled "Labels and Rolls with Adhesives to Stick to Moist and Dry Surfaces;" the disclosure of which is incorporated in its entirety herein and below.

BACKGROUND

The ubiquitous adhesive label is available in a myriad of configurations for use in various applications, including specialty applications. The adhesive label includes an adhesive on its back side and can be initially laminated to an underlying release liner or be a liner-less label.

Adhesive labels may be found in individual sheets, or joined together in a fan-fold stack, or in a continuous roll (web). Label rolls are typically used in commercial applications requiring high volume use of labels.

Some applications of adhesive labels pose significant issues with respect to the adhesives maintaining bonding on items to which the labels are applied. For example, food packages that are warm, hot, and/or wet pose significant challenges to traditional pressure sensitive adhesives that are coated on traditional labels. In fact, traditional labels with pressure sensitive adhesive coatings do not work well for any packaging that has a low surface energy.

The issues with traditional pressure sensitive adhesives also arise in warm and wet environments in which the labels are applied to packaging. The warm and wet environments can make the surface of the packaging become moist and/or can alter the adhesion of the adhesive coating on the label.

Some labels may be customized with a moisture-activated adhesive to apply to moist surfaces; the problem with such labels is that the labels may not also stick well enough to dry surfaces. Conversely, labels customized with the traditional pressure sensitive adhesives do not stick well enough to moist surfaces.

Therefore, what is needed is a label with adhesives that stick to dry, cool surfaces, but maintain and even increase stickiness when applied to packaging that is warm, wet, potentially covered with condensate, and/or packaging that has a low surface energy.

SUMMARY

In various embodiments, labels and label rolls are provided having adhesive combinations (multiple adhesives) arranged in patterns that maintain stickiness (adhesive strength/bonding characteristics) when applied to dry, cool packaging and increase in stickiness when applied to warm, wet packaging.

DETAILED DESCRIPTION

As will be described more completely herein and below, a label is presented with a combination of a non-moisture activated adhesive and a moisture-activated adhesive (or a mixture of a non-moisture activated adhesive and a moisture-activated adhesive) applied in patterns on a backside of the label. The labels may be manufactured in a roll of individually separable labels.

Figure 1A:
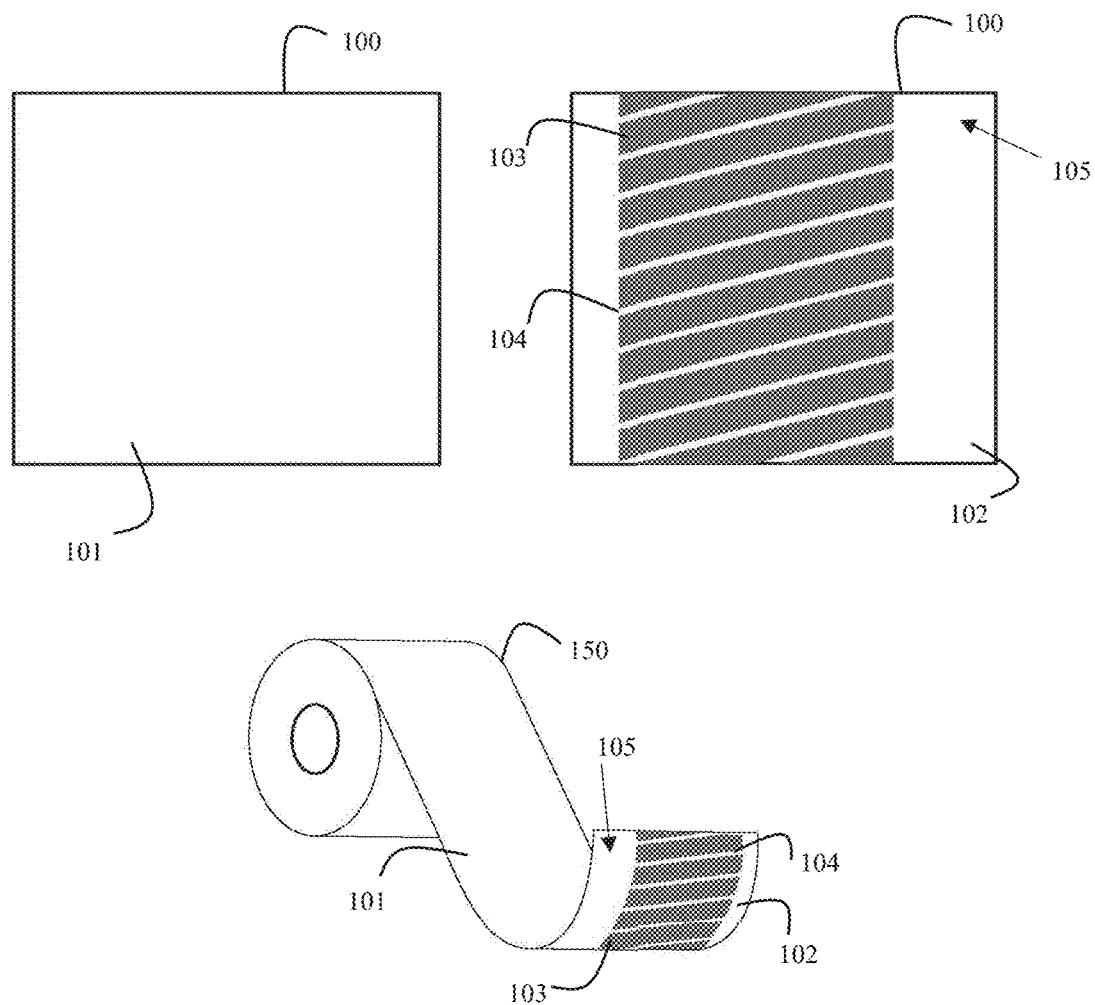
FIG. 1A is a diagram of label with an adhesive pattern having two adhesives and a roll of the labels, according to an example embodiment.
Figure 1B:
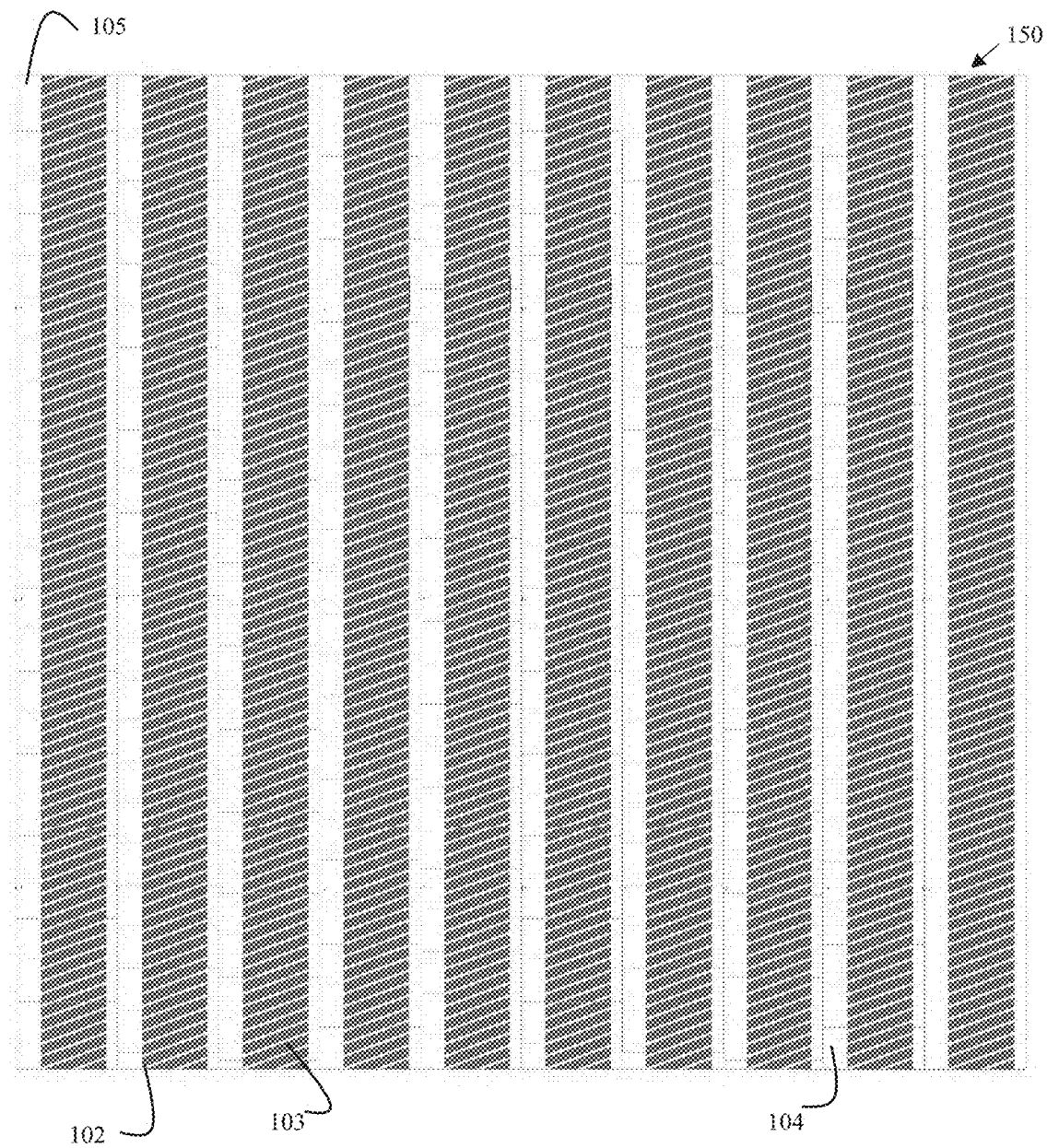
FIG. 1B is a diagram of a printing plate for a press used to produce labels with a different adhesive pattern having two adhesives, according to an example embodiment.
Figure 1C:
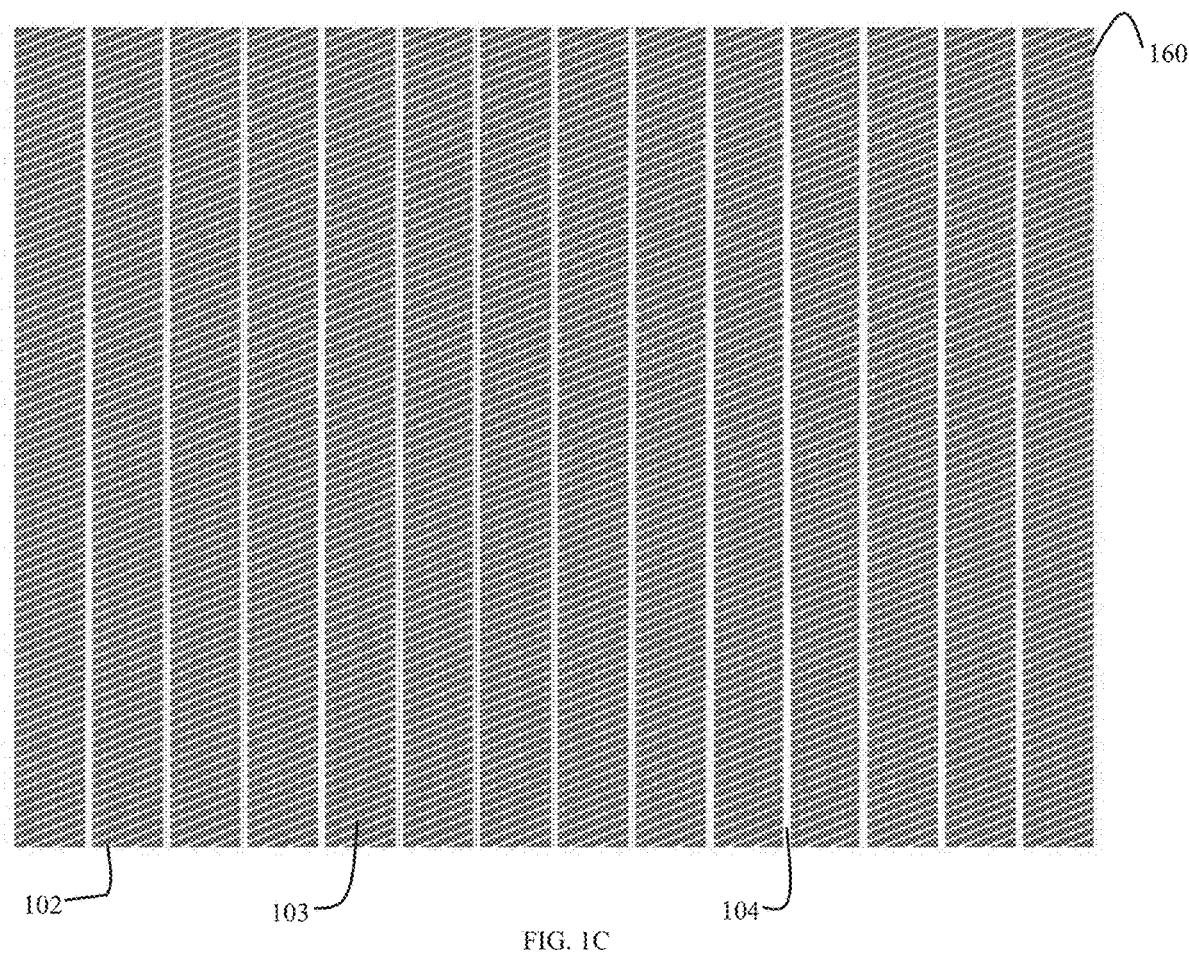
FIG. 1C is a diagram of a printing plate for a press that produces labels with a full width adhesive pattern having two adhesives according to an example embodiment.

FIG. 1A is a diagram of label 100 with an adhesive pattern having two adhesives and a roll of the labels, according to an example embodiment. It is noted that the dimensions of the label 100 can vary in various embodiments presented herein and below. It is noted that different patterns and amounts of the two adhesives (or coat weights for a single formulated adhesive) can be used without departing from the teachings presented herein. As such, FIGS. 1A-1C are intended to be illustrative of just some embodiments for the teachings presented herein.

The label 100 includes: a front side 101, a backside 102, a first adhesive 103 arranged in a first pattern, and a second adhesive 104 arranged in a second pattern. Both the first adhesive 103 and the second adhesive are coated on the backside 101 of a substrate (media) for the label 100.

It is to be noted that in some embodiments, the first adhesive 103 and the second adhesive 104 are a same mixture of an adhesive that comprises a formulation of two-different adhesives and that are arranged in two different patterns or applied with different coat weights within each pattern on the backside 101 of the label 100.

In an embodiment, the first adhesive 103 does not overlap the second adhesive 104 on the backside of the label 100.

In an embodiment, the adhesive 103 is a high-tack (strong adhesive bond) pressure-sensitive adhesive, which is not activated by moisture; the pressure-sensitive adhesive is a non-micro spherical adhesive. In an embodiment, the second adhesive 104 is a moisture-activated adhesive.

In an embodiment, the adhesive 104 is a micro spherical, aqueous, acrylic polymer, water-based, or gum-based adhesive that is moisture-activated.

In an embodiment, the first pattern for the first adhesive 103 is a moisture-activated adhesive and the second adhesive is high-tack pressure-sensitive adhesive, which is not activated by moisture.

In an embodiment, the first pattern for the first adhesive 103 and the second pattern for the second adhesive 104 combine to represent a single final pattern of two different types of adhesives 103 and 104 (or a same mixture of two different types of adhesives) coated on the backside 102 of the label 100.

In the first pattern for the first adhesive 103 as illustrated in the FIG. 1A, the first adhesive 103 is coated in diagonally-directed bars on the backside 101 of the label. There are twelve diagonally-directed bars in the first pattern (not the first two and last two sets of bars are not complete bars). Each set of adjacent bars include a gap or space sufficient to insert (print or coat) the second pattern for the second adhesive 104. The second set of diagonally-directed bars for the second adhesive 104 is patterned such that each diagonally-directed pair of bars for the first adhesive 103 is separated by a single diagonally-directed bar for the second adhesive 104. The first set of bars for the first adhesive 103 includes 12 bars in its pattern whereas the second set of bars for the second adhesive 104 includes 11 bars (again some are not complete bars such as the first two and last two bars of the second adhesive 104).

In the second pattern for the second adhesive 104 as illustrated in the FIG. 1A, the second adhesive 104 is coated as single bars (some complete and some incomplete) with a second thickness to the bars and with sufficient spacing on each side of each bar to accommodate insertion (print or coat) of a single one of the bars for the first adhesive 103. The first adhesive 103 has a first thickness to the bars that is greater than the second thickness of the bars for the second adhesive 104.

It is to be noted that the width of the bars for the first adhesive 103 is larger than the width of each of the bars of the second adhesive 104. However, it is to be noted that any ratio of adhesives can be achieved relative to a size of patterned adhesive elements or relative number of patterned adhesive elements based on the dimensions of the backside 102 of the label 100.

Therefore, the ratio between the widths of the bars for the first adhesive 103 and the second adhesive 104 is configurable to maintain a desired amount of both the first adhesive 103 and the second adhesive 104 on the backside 102 of the label 100.

Additionally, and in one embodiment, a gap 105 on the backside 102 includes no adhesives (devoid of any adhesive). This structure provides an area 105 where the label 100 can be handled before applying the label 100 to packaging without any stickiness. For example, a fast-food employee is able to grab the top left/right corner in the area 105 with their hand or a glove (as is typically used by food workers) and the label 100 will not stick to the employee's hand or glove. In an embodiment, this area 105 that is devoid of any adhesive material is the top left/right corner and is approximately ½ inch from the top of the label 100 and approximately ½ inch from the top left/right side.

In an embodiment, by reducing the amount of nonmoisture activated adhesive (such as a pressure-sensitive adhesive) required on the backside 102 of the label 100 with the addition of a moisture-activated adhesive, the label 100 can be more efficiently processed through a printer (such as a thermal printer). That is, if the entire backside 102 of the label 100 was coated with just one or more types of pressure-sensitive adhesives, the components of the printer are subjected to more adhesive exposure that accumulates on the mechanical components (such as rollers, etc.) of the printer over time while rolls 150 of the labels 100 are processed through the printer. Conversely, there is less buildup of adhesive materials on the mechanical components of the printer in the teachings presented herein, because less pressure-sensitive adhesive is applied to the backside 102 (either by a mixture of non-moisture activated adhesive with a moisture-activated adhesive or by two separate types of adhesives (one of which is the moisture-activated adhesive)).

In an embodiment, an amount of pressure-sensitive adhesive applied to the backside 102 is larger than an amount of moisture-activated adhesive applied to the backside 102.

In an embodiment, an amount of pressure-sensitive adhesive applied to the backside 102 is less than an amount of moisture-activated adhesive applied to the backside 102.

In an embodiment, an amount of pressure-sensitive adhesive applied to the backside 102 is substantially equal to the amount of moisture-activated adhesive applied to the backside 102.

In an embodiment, the coat weight of the two adhesives 103 and 104 are approximate 8-12 grams per square centimeter on the backside 102 of the label 100.

In an embodiment, depending on a tackiness (adhesive bonding strength) of the adhesive, the coat weight for such adhesive used as one of the two adhesives 103 and 140 may be as low as 5 grams per square centimeter on the backside 102 of the label 100.

In an embodiment, a coat weight for the pressure-sensitive adhesive is different from a coat weight of the moisture-activated adhesive.

In an embodiment, the coat weights for each adhesive 103 and 104 can be varied separately based on the line spacing and volume of the cells in an anilox roller that applies the adhesives 103 and 104.

In an embodiment, the first and second patterns can be different in sizes and shapes (rectangles, squares, ovals, grids of shapes) from one another.

In an embodiment, the label 100 includes a single type of adhesive formulated as a mixture of the first adhesive 103 and the second adhesive 104. In this embodiment, the first adhesive 103 and the second adhesive 104 are a single formulated adhesive mixture that comprise both a moisture-activated adhesive and a non-moisture activated adhesive arranged in the two patterns. In an embodiment, the coat weight in the first pattern is different from the coat weight in the second pattern.

The FIG. 1A also illustrates a roll 150 of the labels 100 with two adhesives 103 and 104 coated/printed on the backside 102 of the web comprising a plurality of the labels 100.

The roll 150 includes individually separable labels 100 having two different adhesives 103 and 104 or a single mixture of two different adhesives 103 and 104 arranged in adhesive patterns, according to an example embodiment.

The label roll 150 includes a single substrate (linerless) or may include two substrates one for a liner and one for the labels 100. Each individually defined label 100 of the roll (web) 150 includes a backside 102 upon which the adhesive mixture of two different adhesives 103 and 104 or two different adhesives 103 and 104 are printed (coated) in at least two patterns. Each pattern may include its own coat weight that is a different coat weight from that of the other patterns. An example pattern was illustrated in the FIG. 1A and further example patterns provided by printing plates 150 and 160 on labels 100 are illustrated in the FIGS. 1B and 10 below. Each label 100 may also include preprinted information thereon or may include no printing that can subsequently be printed upon with information to define an individual label 100. Printing on a front side 101 of each label 100 can occur through thermal printing (such as when the front side 101 of the label includes a thermally activated coating) or can occur through laser or dot matrix printing.

Again, each label 100 may be identified through sense marks imaged on the front side 101 of the roll 201 and processed by a printer to cut or tear the labels 101 from each other from the roll 150. In an embodiment, no sense marks are present and the size of each individual label 100 is determined during processing by a printer that is fed the roll 150. The backside 102 of the roll 150 is coated with the two adhesives 103 and 104 or a single mixture of two different adhesives 103 and 104 (as discussed above).

Alternatively, the backside 102 of the roll 150 is a liner that is coated with a release material to which the backside 102 of the labels 100 can be peeled from.

In an embodiment, and in a linerless label 100 application, each individual label 100 is cut or torn from the roll 150 after printing.

FIG. 1B is a diagram of a printing plate 150 for a press that is used to produce labels 100 with a different adhesive pattern having two adhesives, according to an example embodiment.

The pattern produced on the label 100 from the printing plate 150 is vertical rectangular bars for the first adhesive 103 and thinner vertical rectangular bars (have less width) for the second adhesive 104.

In an embodiment, the coat weight of the first adhesive 103 is different from the coat weight of the second adhesive 104.

The first pattern for the first adhesive 103 does not overlap or intersect with the second pattern for the second adhesive 104.

In an embodiment and as was discussed before, the first adhesive 103 and the second adhesive 140 are a same mixture of two different adhesives (moisture-activated and non-moisture activated adhesives) arranged in two separately distinguishable patterns and applied in different coat weights within each separate pattern. In an embodiment, the mixture of adhesive is primarily comprised of a moisture-activated adhesive with added formulation to provide some characteristics of a non-moisture activated adhesive.

It is to be noted that the plate 150 includes a non-adhesive area 105 on the leftmost side in the FIG. 1B, such that when the label 100 is produced there is an area 105 that minimizes sticking to plastic gloves or hands of a person that handles a produced label 100 when applying that label 100 to a surface of an object.

FIG. 1C is a diagram of a printing plate 160 for a press used to produce labels with a full width adhesive pattern having two adhesives according to an example embodiment.

The pattern produced on the label 100 from the printing plate 160 is vertical rectangular bars for the first adhesive 103 and thinner vertical rectangular bars (have less width) for the second adhesive 104. The width between the adhesives 103 and 104 is smaller from that which was illustrated in the FIG. 1B; furthermore, the width of the adhesive 103 is greater and the width of the adhesive 104 than that which was illustrated in the FIG. 1B.

Figure 2:
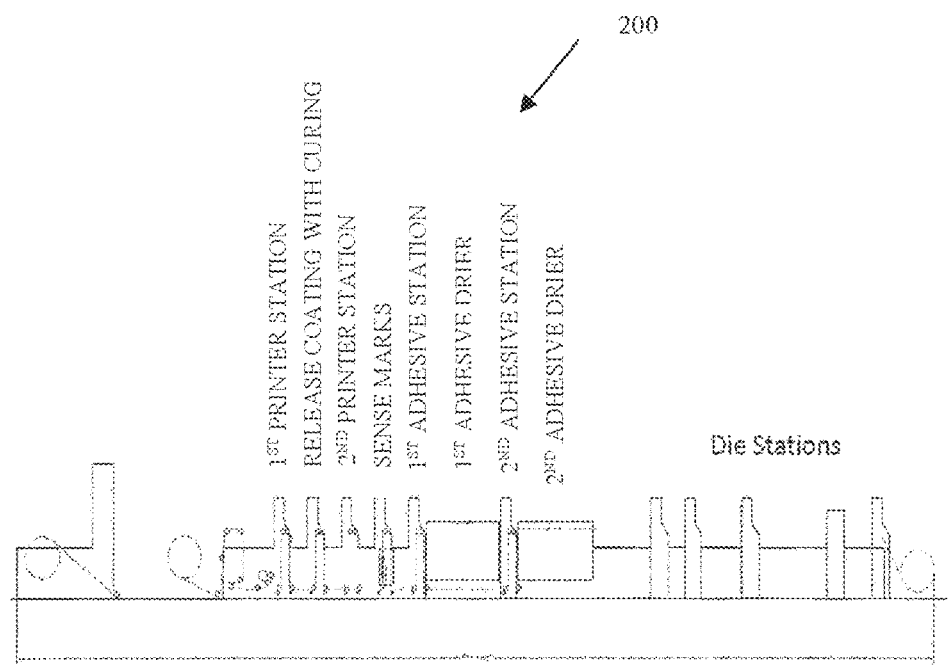
FIG. 2 is a diagram of a printing press that applies two different adhesives on the backside of labels in a roll during manufacture of the roll, according to an example embodiment.

FIG. 2 is a diagram of a printing press 200 that applies two different adhesives 103 and 104 or a single mixture of two adhesives 103 and 104 on the backside of labels 100 in a roll 150 during manufacture of the roll 150 in patterns, according to an example embodiment.

An example press 200 is illustrated. The example press is a modified flexographic or "flexo" printing press. Modification is necessary to print or coat the two different adhesives 103 and 104 or single mixture of two different adhesives 103 and 104 in the different patterns on the backside 102 of the labels 100 in a roll 150. One or more stations presented in the example press 200 may not be required for manufacture of the roll 150 and use of such stations is dependent on the type of label 100 being manufactured. For example, the substrate of the roll 150 may have a front side 101 coated with thermally activated ink, the roll 150 may include a liner and release coatings, etc.

The first adhesive station is where the first adhesive 103 is printed or coated on the backside 102 in the first pattern.

The second adhesive station is where the second adhesive 104 is printed or coated on the backside 102 in the second pattern. In an embodiment (as was discussed at length above), the first adhesive 103 and the second adhesive 104 are a same adhesive mixture comprised of two different adhesives (moisture-activated adhesive formulated with non-moisture activated adhesive). The first and second adhesive stations in this latter embodiment are used to print or coat the mixture in a first coat weight and in a first pattern on the backside 102, and used to print or coat the mixture in a second coat weight and second pattern on the backside 102.

It is to again be noted that the printing press 200 may include additional stations arranged in different orders. Furthermore, the release coating and curing station may include a silicone-based release coating or an aqueous non-silicone release coating. Additionally, although the release coating and curing station is shown as a single station, this may actually be two stations with a UV curing station following any silicone release coating station and with a dryer station following any aqueous non-silicone release coating station.

In an embodiment, the press 200 is configured for to coat and print onto the roll 150: an adhesive primer, adhesive, sense marks, lane marks, any registration marks and slitting guide marks on a non-thermal coated side of the roll 150 in a single pass on the roll 150 with the adhesive coating being last.

Figure 3:
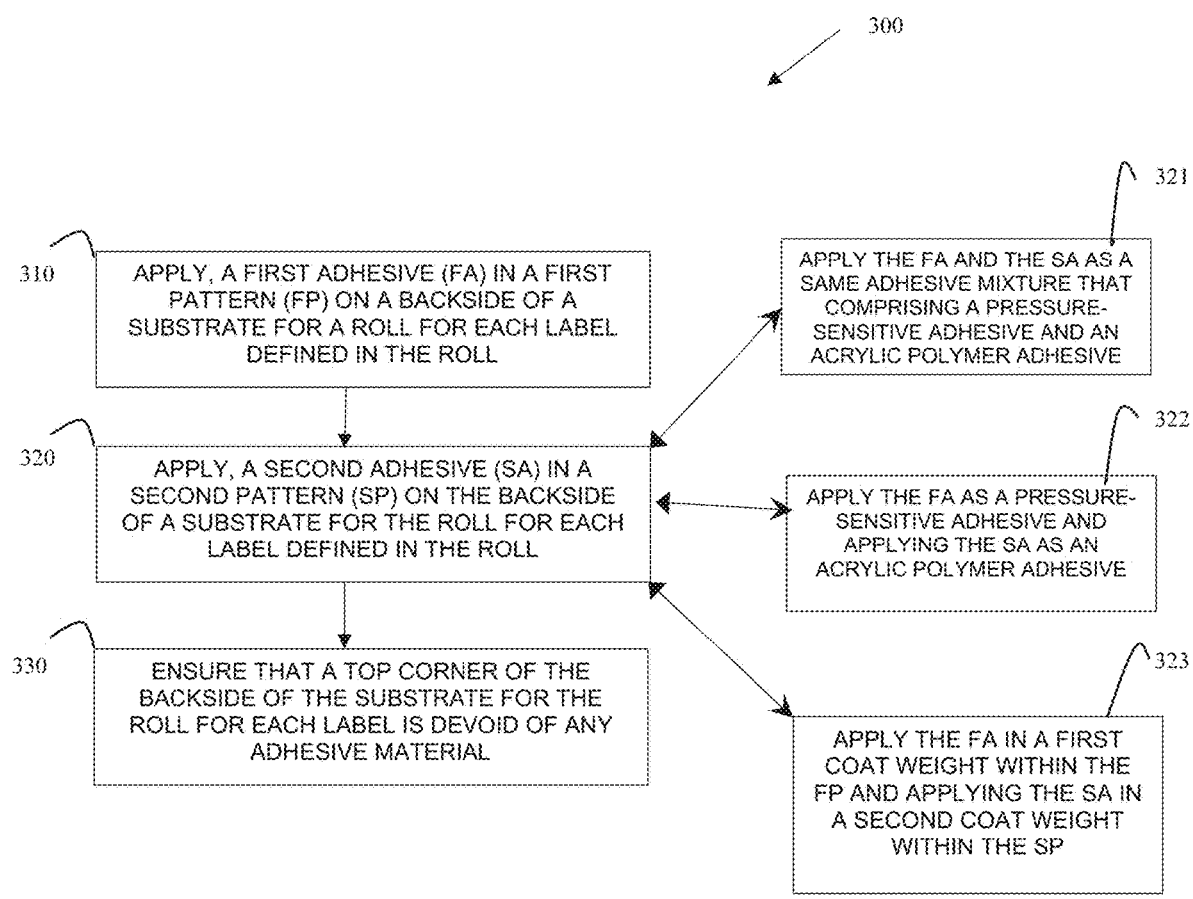
FIG. 3 is a diagram of a method of manufacturing a label having two types of adhesives applied to the backside of the label in patterns, according to an example embodiment.

FIG. 3 is a diagram of a method 300 of manufacturing a label 100 having two types of adhesives 103 and 104 or a single mixture of two adhesives 103 and 104 applied to the backside 102 of the label 100 in patterns, according to an example embodiment.

The method 300 is performed by press 200 of the FIG. 2. That is, non-transitory computer-readable storage media is programmed with instructions for performing the method 300. The instructions are executed by a processor. The processor may be embedded in the press 200 or may be interfaced through a control board to the electro-mechanical components of the press 200, such that the processor can activate and deactivate the componentry of the press 200 to manufacture rolls 150 of the labels 100.

At 310, the press applies a first adhesive in a first pattern on a backside of a substrate for a roll for each label defined in the roll.

At 320, the press applies a second adhesive in a second pattern on the backside of the substrate for the roll for each label defined in the roll.

In an embodiment of 310 and 320, at 321 the press applies the first adhesive and the second adhesive as an adhesive mixture that includes a pressure-sensitive adhesive and an acrylic polymer adhesive.

In an embodiment of 310 and 320, at 322, the press applies the first adhesive as a pressure-sensitive adhesive and the second adhesive as an acrylic polymer adhesive. Also, in an embodiment of 310 and 320, at 323, the press applies the first adhesive in a first coat weight within the first pattern and the press applies the second adhesive in a second coat weight within the second pattern.

In an embodiment, at 330, the press ensures that a top corner of the backside of the substrate for the roll for each label is devoid of any adhesive material.

One now appreciates how a label 100 having two different adhesives 103 and 104 or a single mixture of two different adhesives 103 and 104 can be applied to a backside 102 of the label 100 in patterns to achieve superior adhesive bonding characteristics when the label 100 is affixed to dry, cold, warm, and/or wet surfaces, or when the label 100 is affixed to surfaces in hot and humid operating environments. Any adhesive mixture is comprised of non-moisture activated adhesive and a moisture-activated adhesive formulated as the adhesive mixture. The two different adhesives 103 and 104 include a non-moisture activated adhesive and a moisture-activated adhesive.

Although the present invention has been described with particular reference to certain preferred embodiments thereof, variations and modifications of the present invention can be effected within the spirit and scope of the following claims.

The invention claimed is:

1. A label, comprising:
   a substrate;
   a non-micro spherical, high-tack pressure-sensitive first adhesive; and
   a micro spherical, moisture activated second adhesive;
   wherein the first adhesive and the second adhesive are disposed on a backside of the substrate in a pattern for which the first adhesive is adjacent to the second adhesive, wherein the pattern comprises a diagonal pattern across the backside with each diagonal bar of the first adhesive separated by a diagonal bar of the second adhesive, and each diagonal bar of the second adhesive separated by a diagonal bar of the first adhesive, wherein each diagonal bar of the first adhesive do not overlap nor intersect any of the diagonal bars of the second adhesive, wherein the first adhesive is disposed on the backside of the substrate in a first coat weight and the second adhesive is disposed on the backside of the substrate in a second coat weight, wherein the first coat weight is different from the second coat weight, wherein a width of each diagonal bar for the first adhesive is larger than a width of each diagonal bar of the second adhesive;
   wherein the backside further includes a gap area that is devoid of any adhesive, the gap area is situated on a top left or a top right corner of the backside and is approximately a half inch down from the top and a half inch from a right side or a left side of the backside.

2. The label of claim 1, wherein each diagonal bar of the first adhesive is applied in the pattern with a first thickness and each diagonal bar of the second adhesive is applied in the pattern in a second thickness.

3. The label of claim 2, wherein an amount of the first adhesive in each diagonal bar of the first adhesive within the pattern is greater than an amount of the second adhesive in each diagonal bar of the second adhesive within the pattern.

4. The label of claim 1, wherein the first adhesive is a first type of adhesive and the second adhesive is a second type of adhesive, wherein the first type is different from the second type.

5. The label of claim 1, wherein the first adhesive and the second adhesive are an adhesive mixture comprises of at least two different adhesives.

6. The label of claim 1, wherein the first adhesive is a moisture-activated adhesive and the second adhesive is a non-moisture activated adhesive.

7. A label roll, comprising:
   a substrate; and
   a plurality of labels;
   wherein each label comprises a backside of the substrate that includes a pattern of adhesive;
   wherein the pattern comprises a diagonal pattern across the backside with each diagonal bar of a non-micro spherical, high-tack pressure-sensitive first adhesive separated by a diagonal bar of a micro spherical, moisture activated second adhesive, and each diagonal bar of the second adhesive separated by a diagonal bar of the first adhesive, wherein each diagonal bar of the first adhesive do not overlap nor intersect any of the diagonal bars of the second adhesive, wherein the first adhesive is disposed on the backside of the substrate in a first coat weight and the second adhesive is disposed on the backside of the substrate in a second coat weight, wherein the first coat weight is different from the second coat weight, wherein a width of each diagonal bar for the first adhesive is larger than a width of each diagonal bar of the second adhesive, wherein the backside corresponding to each label further includes a gap area that is devoid of any adhesive, the gap area is situated on a top left or a top right corner of the corresponding backside and is approximately a half inch down from the top and a half inch from a right side or a left side of the corresponding backside.

8. The label roll of claim 7, wherein the first adhesive and the second adhesive are a same mixture of two or more different types of adhesive.

9. The label roll of claim 8, wherein the first adhesive of the same mixture is a pressure-sensitive adhesive or a non-micro spherical adhesive, and wherein the second adhesive of the same mixture is an acrylic polymer adhesive.

10. The label roll of claim 7, wherein the first adhesive is a first adhesive type and the second adhesive is a second adhesive type, and wherein the first adhesive type is different from the second adhesive type.

11. The label roll of claim 7, wherein a first thickness of the first adhesive in each diagonal bar of the first adhesive within the pattern is different from a second thickness of the second adhesive in each diagonal bar of the second adhesive within the pattern.

12. A label, comprising:
   a substrate;
   at least one non-micro spherical, high-tack pressure-sensitive first adhesive strip;
   at least one micro spherical, moisture second adhesive strip; and
   a backside of the substrate comprising a pattern of the at least one first adhesive strip and the at least one second adhesive strip;
   wherein the pattern comprises diagonal bars across the backside of the substrate for the at least one first adhesive strip and the at least one second adhesive strip
   wherein the diagonal bars of at least one first adhesive strip and the at least one second adhesive strip do not intersect and do not overlap within the pattern;
   wherein each diagonal bar of the at least one first adhesive strip within the pattern is adjacent to a corresponding diagonal bar of the at least one second adhesive strip within the pattern;
   wherein each diagonal bar of the at least one second adhesive strip is adjacent to a corresponding diagonal bar of the at least one first adhesive strip within the pattern;
   wherein the at least one first adhesive strip is disposed on the backside of the substrate in a first coat weight and the at least one second adhesive strip is disposed on the backside of the substrate in a second coat weight, wherein the first coat weight is different from the second coat weight;
   wherein a width of each diagonal bar for the at least one first adhesive strip is larger than a width of each diagonal bar of the at least one second adhesive strip;

wherein the backside of the label further includes a gap area that is devoid of any adhesive, the gap area is situated on a top left or a top right corner of the backside and is approximately a half inch down from the top and a half inch from a right side or a left side of the backside.

\* \* \* \* \*